(12) United States Patent
Ho et al.

(10) Patent No.: US 9,794,847 B2
(45) Date of Patent: Oct. 17, 2017

(54) CENTRAL CONTROL DEVICE AND LOAD BALANCING METHOD THEREOF

(71) Applicant: Institute For Information Industry, Taipei (TW)

(72) Inventors: Chih-Hsiang Ho, Taipei (TW); Li-Sheng Chen, Yilan (TW); Wei-Ho Chung, Taipei (TW); Sy-Yen Kuo, Taipei (TW)

(73) Assignee: Institute For Information Industry, Taipei (TW)

( * ) Notice: Subject to any disclaimer, the term of this patent is extended or adjusted under 35 U.S.C. 154(b) by 407 days.

(21) Appl. No.: 14/620,338

(22) Filed: Feb. 12, 2015

(65) Prior Publication Data
US 2016/0157132 A1 Jun. 2, 2016

(30) Foreign Application Priority Data
Dec. 1, 2014 (TW) .............................. 103141580 A

(51) Int. Cl.
*H04W 36/22* (2009.01)
*H04W 28/08* (2009.01)
(52) U.S. Cl.
CPC ........... *H04W 36/22* (2013.01); *H04W 28/08* (2013.01)
(58) Field of Classification Search
CPC .............................. H04W 36/22; H04W 28/08
See application file for complete search history.

(56) References Cited

U.S. PATENT DOCUMENTS

| | | | | |
|---|---|---|---|---|
| 9,026,166 B2* | 5/2015 | Yamazaki | ............. | H04L 5/0035 370/328 |
| 2002/0110105 A1* | 8/2002 | Awater | .................. | H04W 36/22 370/338 |
| 2005/0059408 A1* | 3/2005 | Tiedemann, Jr. | ..... | H04W 16/00 455/452.1 |
| 2009/0285159 A1 | 11/2009 | Rezaiifar et al. | | |
| 2013/0052989 A1 | 2/2013 | Mahalingam | | |

* cited by examiner

*Primary Examiner* — Mohammad Anwar
(74) *Attorney, Agent, or Firm* — Skaar Ulbrich Macari, P.A.

(57) ABSTRACT

A central control device and a load balancing method thereof are provided. The central control device includes a network interface, a storage and a processor. The network interface is connected to a plurality of base stations and receives a load parameter from each base station. The storage stores the load parameters. The processor is electrically connected to the storage and the network interface. For each base station, the processor calculates a load indication according to the load parameter thereof to determine whether the base station is an overloaded base station based on the load indication, and calculates an offload priority indication according to the load indication, a quantity of off-loadable resources of at least one neighboring base station, a first weighting factor and a second weighting factor. The processor determines an offload order of the overloaded base stations according to the offload priority indications.

18 Claims, 13 Drawing Sheets

CENTRAL CONTROL DEVICE AND LOAD BALANCING METHOD THEREOF

PRIORITY

This application claims the benefit of priority based on Taiwan Patent Application No. 103141580 filed on Dec. 1, 2014, which is hereby incorporated by reference in its entirety.

FIELD

The present invention relates to a central control device and a load balancing method thereof. In particular, the central control device of the present invention calculates a load indication of each base station according to a load parameter of the base station, and calculates an offload priority indication of each overloaded base station according to the load indication, a quantity of off-loadable resources of at least one neighboring base station, a first weighting factor and a second weighting factor to determine an offload order of the overloaded base stations.

BACKGROUND

With the advancement of network technologies, wireless communication technologies have found wide application in people's daily life. Because of the increasing demand for data transmission through wireless communication, telecommunication operators and network service suppliers often need to increase the number of base stations or expand the deployment of the base stations to improve communication quality for users.

However, when a large number of terminals occupy the resources of the same base station at the same time, the resource occupation rate of the base station will become too high, which is likely to result in a relatively high call blocking rate or call drop rate. Currently, when it comes to the management and control of the load of base stations, most of the telecommunication operators and network service suppliers only take the load of individual base stations or the load of part of the base stations of the network into consideration but do not consider whether the overall load of the network is balanced. Moreover, when the load of a base station is too large, the base station is only able to reject the connection with other terminals to avoid further occupation of the resources, but can not reduce the current load. Furthermore, although some telecommunication operators and network service suppliers has proposed to balance the load of the base stations by allowing the terminals to select and connect with a base station that has a relatively small load according to the load of individual base stations, the overall load of the base stations is not considered in this method. Thus, when several terminals select and connect with the same base station simultaneously, the load of the single base station will increase sharply to result in a relatively high call blocking rate or call drop rate.

Accordingly, an urgent need exists in the art to provide a load balancing mechanism for base stations which considers the overall load of base stations in a network, determines an offload order of overloaded base stations, and further prevents the base station that is not overloaded in the beginning from turning into an overloaded base station because of an offload procedure. In this way, the overall load of the base stations in the network can be balanced, thereby, improving the wireless resource spectrum efficiency and transmission network throughput effectively.

SUMMARY

An objective of the present invention includes providing a load balancing mechanism which can consider both the load of a base station and an offload amount that base stations neighboring to the base station can undertake to determine an offload order of overloaded base stations. Then, by the load balancing mechanism of the prevent invention, the load of the deployed network can be adjusted efficiently to optimize the load distribution of the deployed network to improve the wireless resource spectrum efficiency and the transmission network throughput effectively.

To achieve the aforesaid objective, certain embodiments of the present invention include a central control device. The central control device comprises a network interface, a storage and a processor. The network interface is connected to a plurality of base stations. The processor is electrically connected to the storage and the network interface and is configured to execute the following operations: (a) receiving a load parameter from each of the base stations via the network interface and storing the load parameters into the storage; (b) calculating a load indication of each of the base stations according to the load parameter of each of the base stations, and calculating a network load balancing indication according to a total number of the base stations and the load indications; (c) determining that the base station, the load indication of which exceeds an allowable load range, is an overloaded base station; (d) determining whether the network load balancing indication exceeds an allowable balancing range when the base stations comprise a plurality of overloaded base stations; (e) calculating an offload priority indication for each of the overloaded base stations according to the load indication, a quantity of off-loadable resources of at least one neighboring base station, a first weighting factor and a second weighting factor when the network load balancing indication exceeds the allowable balancing range; and (f) determining an offload order of the overloaded base stations according to the offload priority indications.

Moreover, certain embodiments of the present invention include a load balancing method for use in a central control device. The central control device comprises a network interface, a storage and a processor. The network interface is connected to a plurality of base stations. The processor is electrically connected to the storage and the network interface. The load balancing method is executed by the processor and comprises the following steps: (a) receiving a load parameter from each of the base stations via the network interface and storing the load parameters into the storage; (b) calculating a load indication of each of the base stations according to the load parameter of each of the base stations, and calculating a network load balancing indication according to a total number of the base stations and the load indications; (c) determining that the base station, the load indication of which exceeds an allowable load range, is an overloaded base station; (d) determining whether the network load balancing indication exceeds an allowable balancing range when the base stations comprise a plurality of overloaded base stations; (e) calculating an offload priority indication for each of the overloaded base stations according to the load indication, a quantity of off-loadable resources of at least one neighboring base station, a first weighting factor and a second weighting factor when the network load balancing indication exceeds the allowable balancing range;

and (f) determining an offload order of the overloaded base stations according to the offload priority indications.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. It should be appreciated that these example embodiments are not intended to limit the present invention to any specific example, embodiment, environment, applications or particular implementations described in these example embodiments. Therefore, the description of these example embodiments is only for purpose of illustration rather than to limit the present invention. The scope claimed in this application shall be governed by the claims.

In the following embodiments and attached drawings, elements unrelated to the present invention are omitted from depiction. Dimensional relationships among individual elements in the attached drawings are illustrated only for ease of understanding, but not to limit the actual scale.

Figure 1:
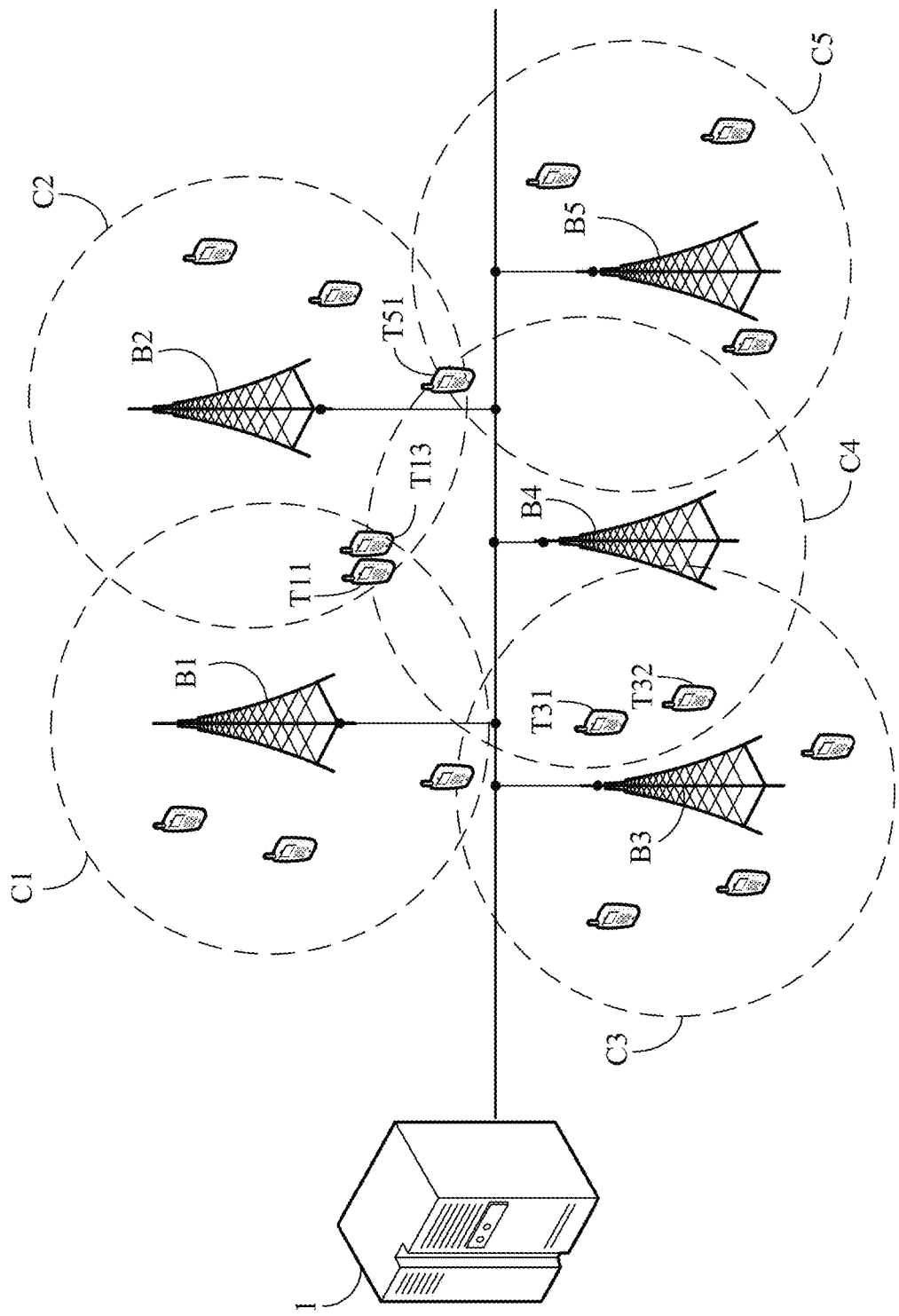
FIG. 1 is a view depicting the relationships between a central control device 1, base stations B1, B2, B3, B4 and B5 of the present invention and terminals within signal coverage ranges C1~C5 of the base stations B1~B5.
Figure 2:
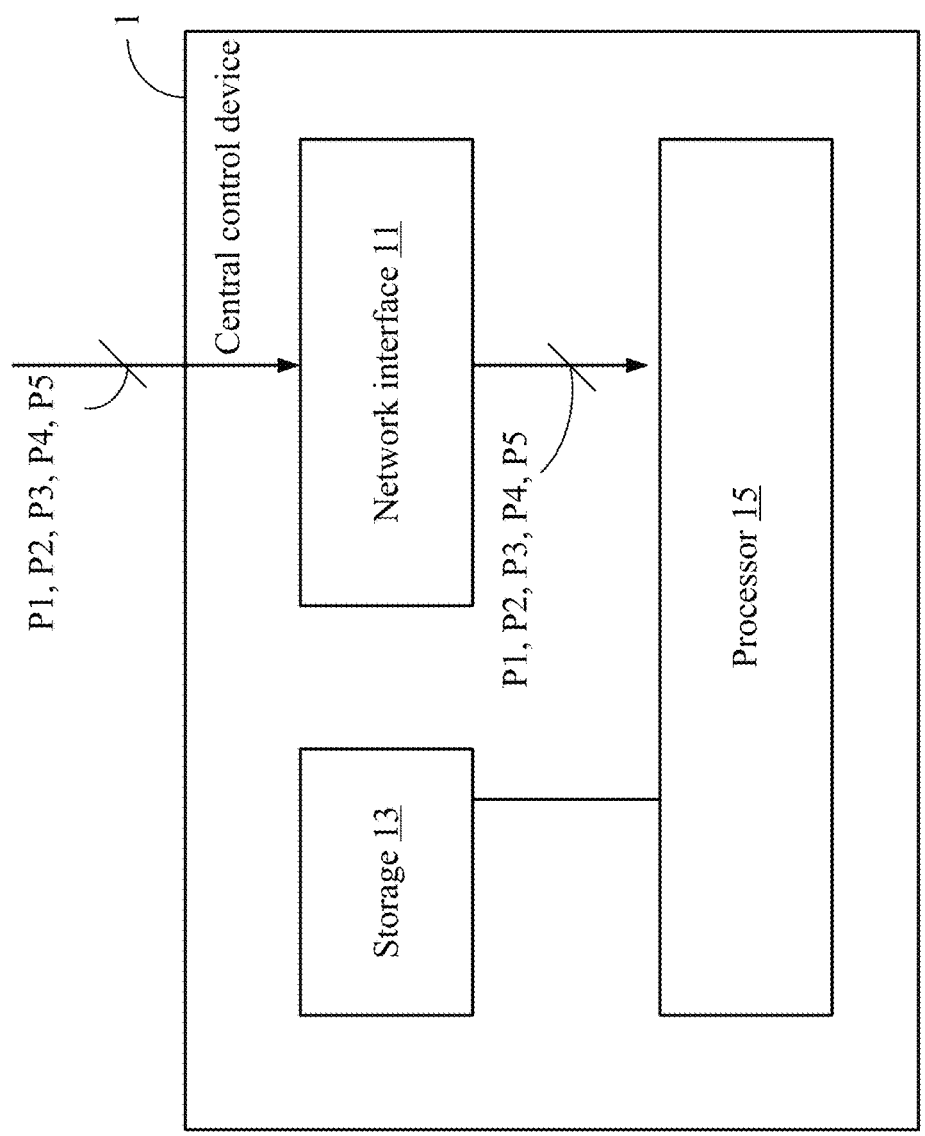
FIG. 2 is a schematic view of a central control device 1 according to the first embodiment to third embodiment of the present invention.
Figure 3A:
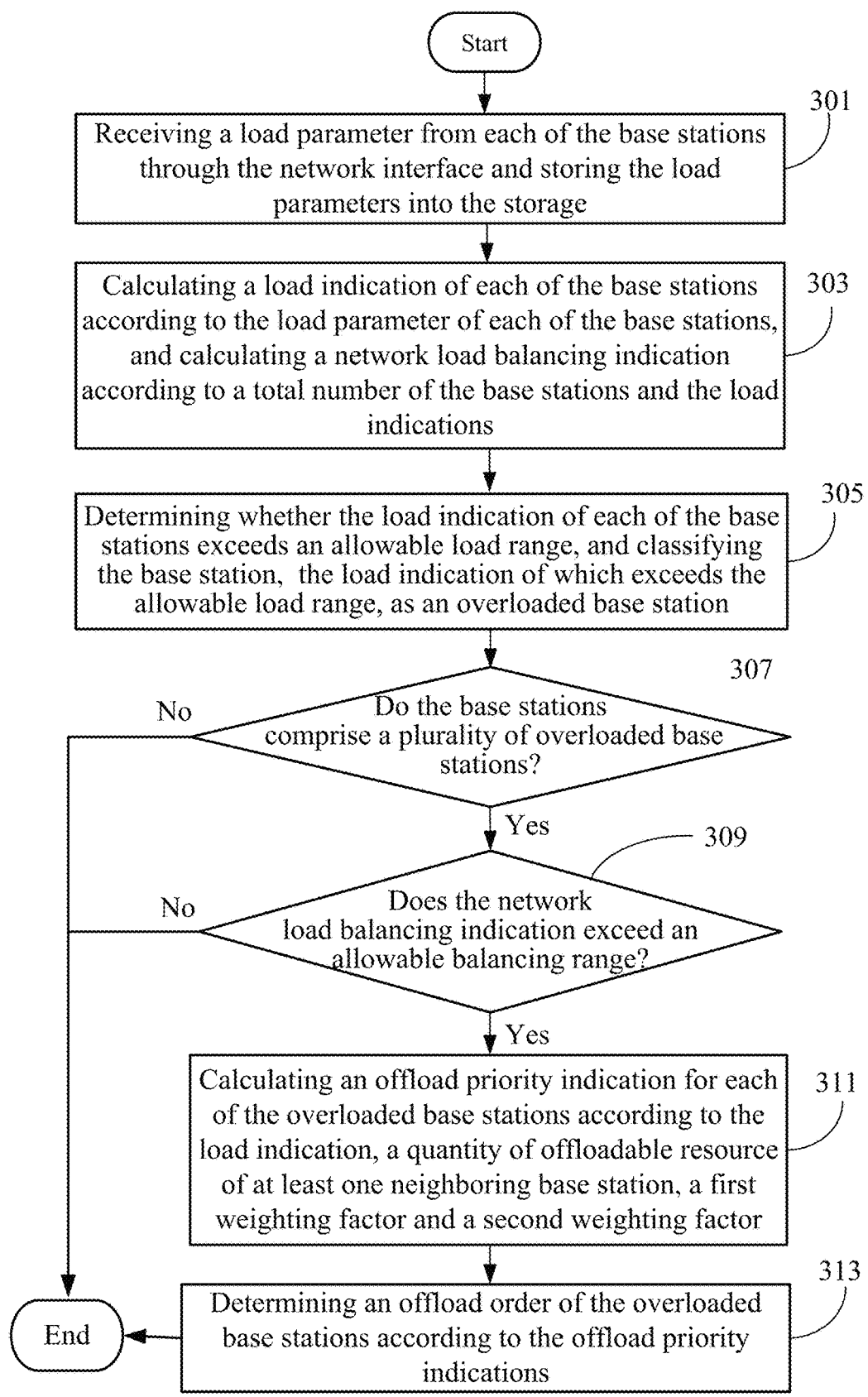
FIG. 3A is a flowchart diagram of a load balancing method according to the first embodiment of the present invention.

FIGS. 1, 2 and 3A to 3C illustrate the first embodiment of the present invention. FIG. 1 is a view depicting the relationships between a central control device 1, base stations B1, B2, B3, B4 and B5 of the present invention and terminals within signal coverage ranges of the base stations B1~B5. FIG. 2 is a schematic view of the central control device 1 of the present invention, and FIG. 3A is a flowchart diagram of a load balancing method adapted for the central control device 1.

As shown in FIG. 1, the central control device 1 connects to the base stations B1~B5 in a wired way to monitor the base stations B1~B5. The base stations B1~B5 have signal coverage ranges C1~C5 respectively; one or more terminals exist in each of the signal coverage ranges C1~C5. In the present invention, the central control device 1 enables the overloaded base stations to perform an offload procedure appropriately through the load balancing mechanism of the present invention and according to the load of the base stations B1~B5 to optimize the load distribution of the deployed network.

It shall be appreciated that the central control device 1 of the present invention and the load balancing method thereof may be applied to any wireless network system, e.g., a cellular network system (the $2^{nd}$-, $3^{rd}$-, $4^{th}$-generation mobile network system), a wireless local area network (Wi-fi) system, a hybrid network system, etc. Moreover, the number of base stations connected to the central control device 1 and the number of the terminals within the respective signal coverage ranges in FIG. 1 are only described for illustration but are not intended to limit the present invention.

The central control device 1 comprises a network interface 11, a storage 13 and a processor 15, as shown in FIG. 2. The network interface 11 is connected to a plurality of base stations in a specific region (e.g., the base stations B1~B5 in this embodiment), and receives load parameters P1, P2, P3, P4 and P5 of the base stations B1~B5. In detail, each of the load parameters P1~P5 may comprise the resource usage condition of each of the base stations B1~B5, the off-loadable resource of each of the base stations B1~B5, etc. The central control device 1 can monitor the load of each of the base stations by receiving the load parameters P1~P5 of the base stations B1~B5 continuously.

The processor 15 is electrically connected to the network interface 11 and the storage 13, and is configured to store the load parameters P1, P2, P3, P4 and P5 into the storage 13. The processor 15 executes a load balancing procedure, which comprises the following operations (i.e., steps in the flowchart diagram of the load balancing method depicted in FIG. 3A), according to the load parameters P1, P2, P3, P4 and P5 to determine an offload order of base stations, the load of which is excessive (called "overloaded base stations" hereinafter).

First, in step 301, the processor 15 receives the load parameters P1~P5 of the base stations B1~B5 via the network interface 11, and stores the load parameters P1~P5 into the storage 13. Then, in step 303, the processor 15 calculates the load indication of each of the base stations B1~B5 according to the load parameter of each of the base stations B1~B5, and calculates the network load balancing indication according to a total number of all the base stations in the region (for simplicity, it is assumed that the region only comprises the base stations B1~B5, so the total number is 5) and the load indication of each of the base stations B1~B5.

For example, the load indication represents the resource block utilization ratio of each of the base stations and has a value ranging between 0 and 1. There are fewer usable resource blocks for the base station (i.e., higher load of the base station) if the value of the load indication is closer to 1; this is likely to result in a relatively high call blocking rate or call drop rate. On the contrary, there are more usable resource blocks for the base station (i.e., lower load of the base station) if the value of the load indication is closer to 0. Moreover, the network load balancing indication indicates whether the load distribution of the base stations in the network is balanced or not. Therefore, the larger the value of the network load balancing indication is, the more balanced the load distribution of the base stations in the network is; on the contrary, the smaller the value of the network load balancing indication is, the less balanced the load distribution of the base stations in the network is.

However, as can be appreciated by those of ordinary skill in the art, the load indication and the network load balancing indication may also be expressed in other manners. In such cases there are more usable resource blocks for the base station if its value of the load indication is larger, and with the larger value of the network load balancing indication, the load distribution of the base stations is less balanced in the network. Thus, the way in which the load indication and the network load balancing indication are expressed is not intended to limit the present invention.

In step 305, the processor 15 determines whether the load parameters P1~P5 of the base stations B1~B5 exceed an allowable load range, and classifies the base station(s), whose load indication exceeds the allowable load range, as the overloaded base station(s). Specifically, the allowable load range can be preset by telecommunication operators and network service suppliers according to experiences in deploying the practical network and base stations. When the load indication of the base station exceeds the allowable load range, this means that the load of the base station is too great, and the central control device 1 can accordingly classify the base station as the overloaded base station.

Figure 3B:
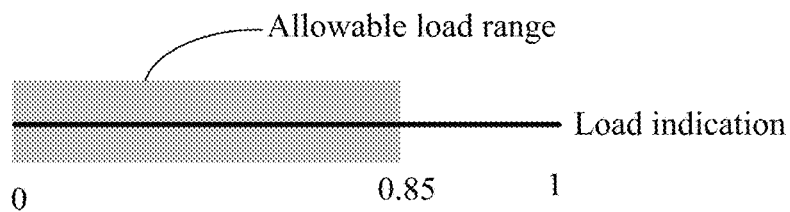
FIG. 3B is a view depicting the relationships between an allowable load range and a load indication.
Figure 3B:
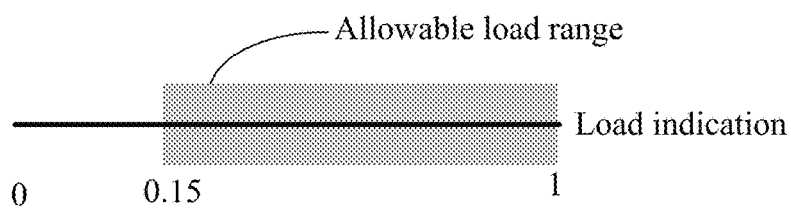

For example, as shown in FIG. 3B, two different expressions of the load indication are shown therein. In Expression One, the larger the value of the load indication is, the larger the resource utilization ratio of the base station is (i.e., as shown in Expression One of FIG. 3B, there are fewer usable resources for the base station if the value of the load indication is closer to 1). Here, it is assumed that the range of the load indication between 0 and 0.85 is defined as the allowable load range by telecommunication operators and network service suppliers according to experiences in deploying the practical network and base stations. In this case, when the value of the load indication of the base station exceeds the range between 0 and 0.85 (i.e., the value of the load indication is higher than 0.85), the central control device 1 will classify the base stations the overloaded base station.

As described above, the load indication may also be expressed in a different way. In Expression Two, the smaller the value of the load indication is, the larger the resource utilization ratio of the base station is (i.e., as shown in Expression Two of FIG. 3B, there are fewer usable resources for the base station if the value of the load indication is closer to 0). Here, it is assumed that the range of the load indication between 0.15 and 1 is defined as the allowable load range by telecommunication operators and network service suppliers according to experiences in deploying the practical network and base stations. In this case, when the value of the load indication of the base station exceeds the range between 0.15 and 1 (i.e., the value of the load indication is lower than 0.15), the central control device 1 will classify the base station as the overloaded base station. It shall be appreciated that the allowable load range and the value interval of the load indication (i.e., from 0 to 1) shown in FIG. 3B are only for illustration purpose but are not intended to limit the present invention.

Then, in step 307, the processor 15 determines whether the network comprises a plurality of overloaded base stations. If the determination result is "no", the processor 15 ends the load balancing procedure. If the determination result is "yes", the processor 15 further executes step 309 to determine whether the network load balancing indication exceeds an allowable balancing range. Similarly, the allowable balancing range may be preset by telecommunication operators and network service suppliers according to experiences in deploying the practical network and base stations. When the network load balancing indication exceeds an allowable balancing range, this means that the load of the base stations in the network is imbalanced.

Figure 3C:
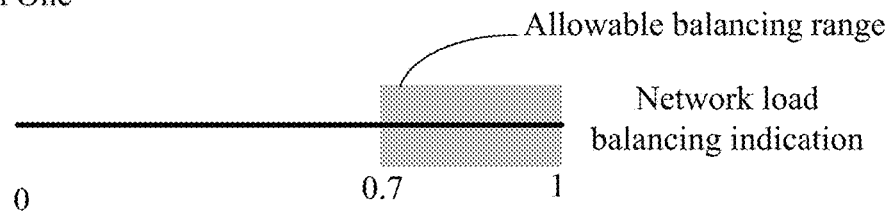
FIG. 3C is a view depicting relationships between an allowable balancing range and a network load balancing indication.
Figure 3C:
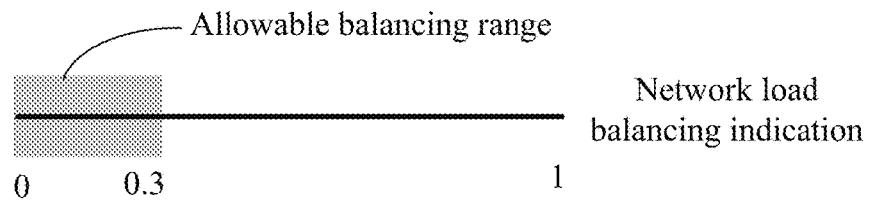

For example, as shown in FIG. 3C, two different expressions of the network load balancing indication are shown therein. In Expression One, the larger the value of the network load balancing indication is, the more balanced the load of the base stations in the network is. Here, it is assumed that the range of the network load balancing indication between 0.7 and 1 is defined as the allowable balancing range by telecommunication operators and network service suppliers according to experiences in deploying the practical network and base stations. In this case, when the value of the network load balancing indication of the network exceeds the range between 0.7 and 1 (i.e., the value of the network load balancing indication is lower than 0.7), this means that the load of the base stations in the network is imbalanced. At this point, if the network comprises several overloaded base stations, then the smaller the network load balancing indication is, the greater the possibility that the occupied resources of overloaded base station can be offloaded to the base station with a relatively small load.

On the other hand, in Expression Two, the smaller the value of the network load balancing indication is, the more balanced the load of the base stations in the network is. Here, it is assumed that the range of the network load balancing indication between 0 and 0.3 is defined as the allowable balancing range by telecommunication operators and network service suppliers according to experiences in deploying the practical network and base stations. In this case, when the value of the network load balancing indication of the network exceeds the range between 0 and 0.3 (i.e., the value of the network load balancing indication is higher than 0.3), this means that the load of the base stations in the network is imbalanced. It shall be appreciated that the allowable balancing range and the value interval of the network load balancing indication (i.e., from 0 to 1) shown in FIG. 3C are only for illustration purpose but are not intended to limit the present invention. When it is determined that the network load balancing indication exceeds an allowable balancing range, the processor 15 executes steps 311 and 313. On the contrary, if the network load balancing indication falls within the allowable balancing range, the processor 15 ends the load balancing procedure.

It shall be appreciated that the processor 15 performs the load balancing procedure periodically (e.g., every 5 min, 10 min or 30 min, etc.). By receiving the load parameters P1~P5 of the base stations B1~B5 periodically and performing the load balancing procedure periodically, the central control device 1 can monitor the load of each of the base stations continuously.

Here, it is assumed that the base stations B1, B3 and B5 are overloaded base stations. Thus, instep 311, the processor 15 calculates an offload priority indication for each of the overloaded base stations B1, B3 and B5 according to the load indication thereof, a quantity of off-loadable resources of at least one neighboring base station thereof, a first weighting factor and a second weighting factor. Here, the first weighting factor is a weighting value corresponding to the load indication, and the second weighting factor is a weighting value corresponding to the off-loadable resource of the at least one neighboring base station. It shall be appreciated that the "offloadable resource" means the resources that is able to be provided to offload other base stations, and the off-loadable resource of at least one neighboring base station may be obtained by the load parameter of each of the base stations. Next, in the step 313, the processor 15 determines an offload order of the overloaded base stations B1, B3, and B5 according to the offload priority indication of each of the overloaded base stations B1, B3 and B5.

It shall be appreciated that the first weighting factor and the second weighting factor may be preset by telecommunication operators and network service suppliers according to experiences in deploying the practical network and base stations. In detail, the central control device of the present invention and the load balancing mechanism thereof consider both the load of each of the overloaded base stations and unused resource blocks of base stations neighboring to each of the overloaded base stations to determine which overloaded base station in the local area network should perform the offload procedure first.

Figure 4A:
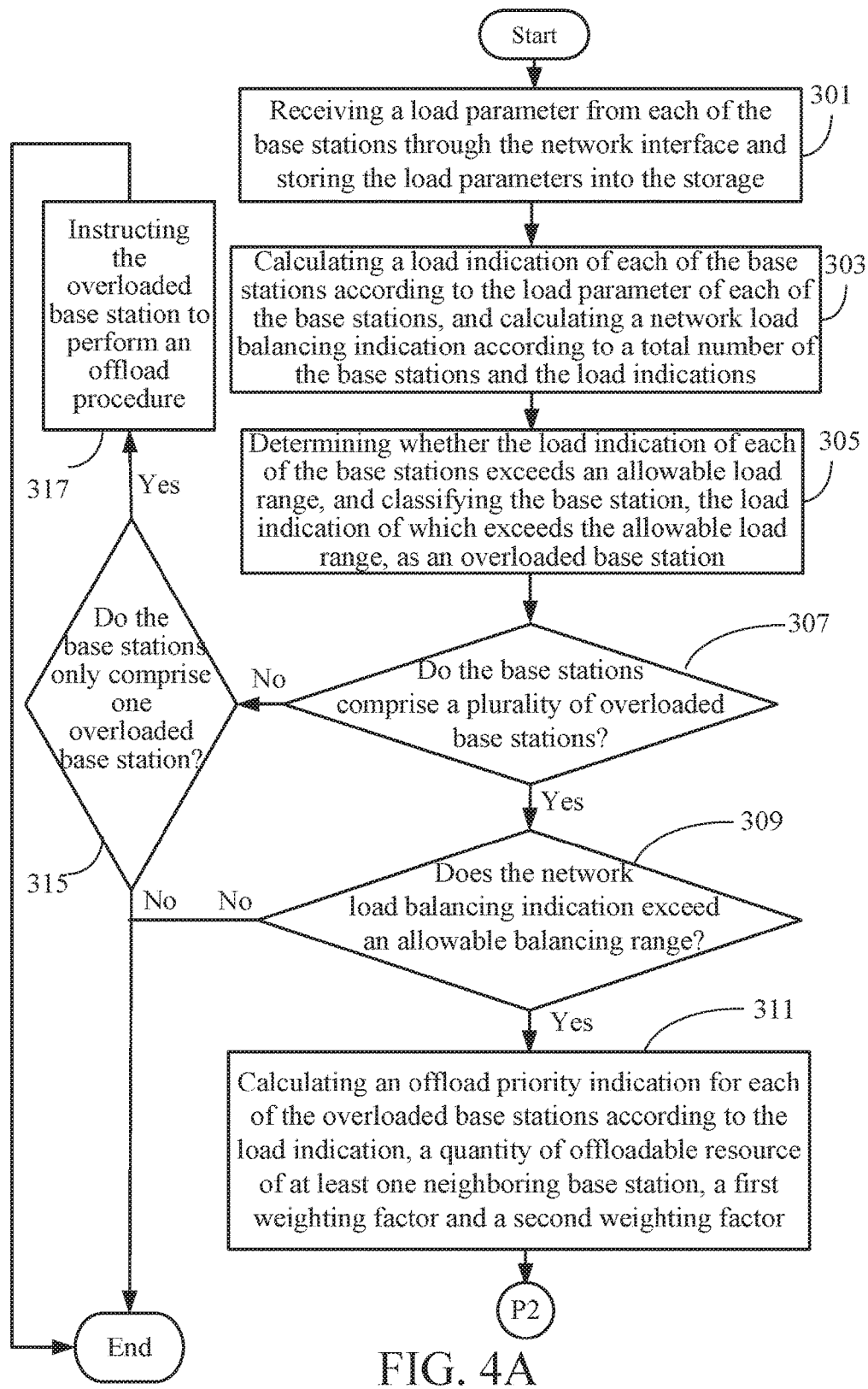
FIG. 4A and FIG. 4B are flowchart diagrams of a load balancing method according to the second embodiment of the present invention.
Figure 4B:
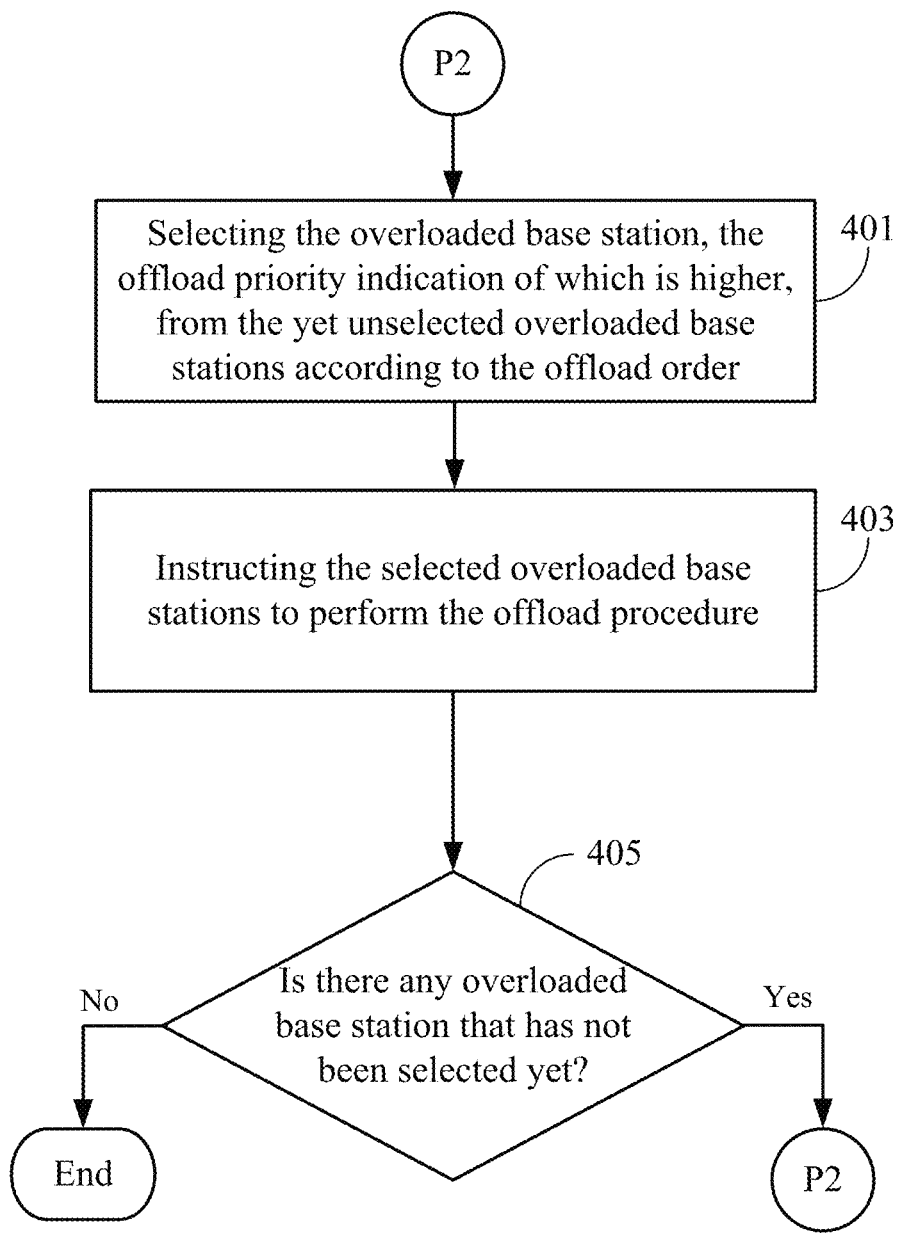

As shown in FIG. 4A and FIG. 4B, the second embodiment of the present invention is an extension of the first embodiment. In this embodiment, if the processor 15 determines that the network does not comprise a plurality of overloaded base stations in step 307, then the processor 15 further executes step 315 to determine whether the network only comprises one overloaded base station. If the determination result is "no", the processor 15 ends the load balancing procedure. If the determination result is "yes", the processor 15 executes step 317 to instruct the overloaded base station to perform the offload procedure. For example, if only the base station B1 of the network is an overloaded base station and the network does not only comprise the base station B1, the processor 15 generates a notification message and transmits the notification message to the overloaded base station B1 to instruct the overloaded base station B1 to perform the offload procedure.

On the other hand, if the base stations B1, B3 and B5 in the network are all overloaded base stations, the processor 15 selects the overloaded base station whose offload priority indication is higher to perform the offload procedure first after the offload order of the overloaded base stations B1, B3 and B5 is determined according to the offload priority indications. Specifically, in step 401, the processor 15 selects the overloaded base station whose offload priority indication is higher from the yet unselected overloaded base stations according to the offload order. Then, in step 403, the processor 15 instructs the selected overloaded base station to perform the offload procedure. Specifically, the processor 15 generates a notification message and transmits the notification message to the selected overloaded base station to instruct the selected overloaded base station to perform the offload procedure.

Next, the processor 15 executes step 405 to determine whether any overloaded base station has not been selected yet. If there are overloaded base stations that have not been selected yet, the processor 15 returns to the step 401. If all the overloaded base stations have been selected to perform the offload procedure, the processor 15 ends the load balancing procedure. In other words, in this embodiment, the processor 15 instructs the overloaded base stations to perform the offload procedure sequentially according to the offload order of the offload priority indications. The overloaded base station that has the higher offload priority indication performs the offload procedure first.

For example, when the offload priority indication of the overloaded base station B1 is larger than the offload priority indication of the overloaded base station B3, and the offload priority indication of the overloaded base station B3 is larger than the offload priority indication of the overloaded base station B5, the processor 15 first instructs the overloaded base station B1 to perform the offload procedure, then instructs the overloaded base station B3 to perform the offload procedure, and finally instructs the overloaded base station B5 to perform the offload procedure. In an example, the overloaded base station B1 performs the offload procedure to hand over a terminal T11 and/or a terminal T13 (which are located within the signal coverage ranges C1, C2 and C4 of the base stations B1, B2 and B4 simultaneously) to the base station B2 or the base station B4. In another example, the overloaded base station B3 performs the offload procedure to hand over a terminal T31 and/or a terminal T32 (which are located within the signal coverage ranges C3 and C4 of the base stations B3 and B4 simultaneously) to the base station B4.

Figure 4C:
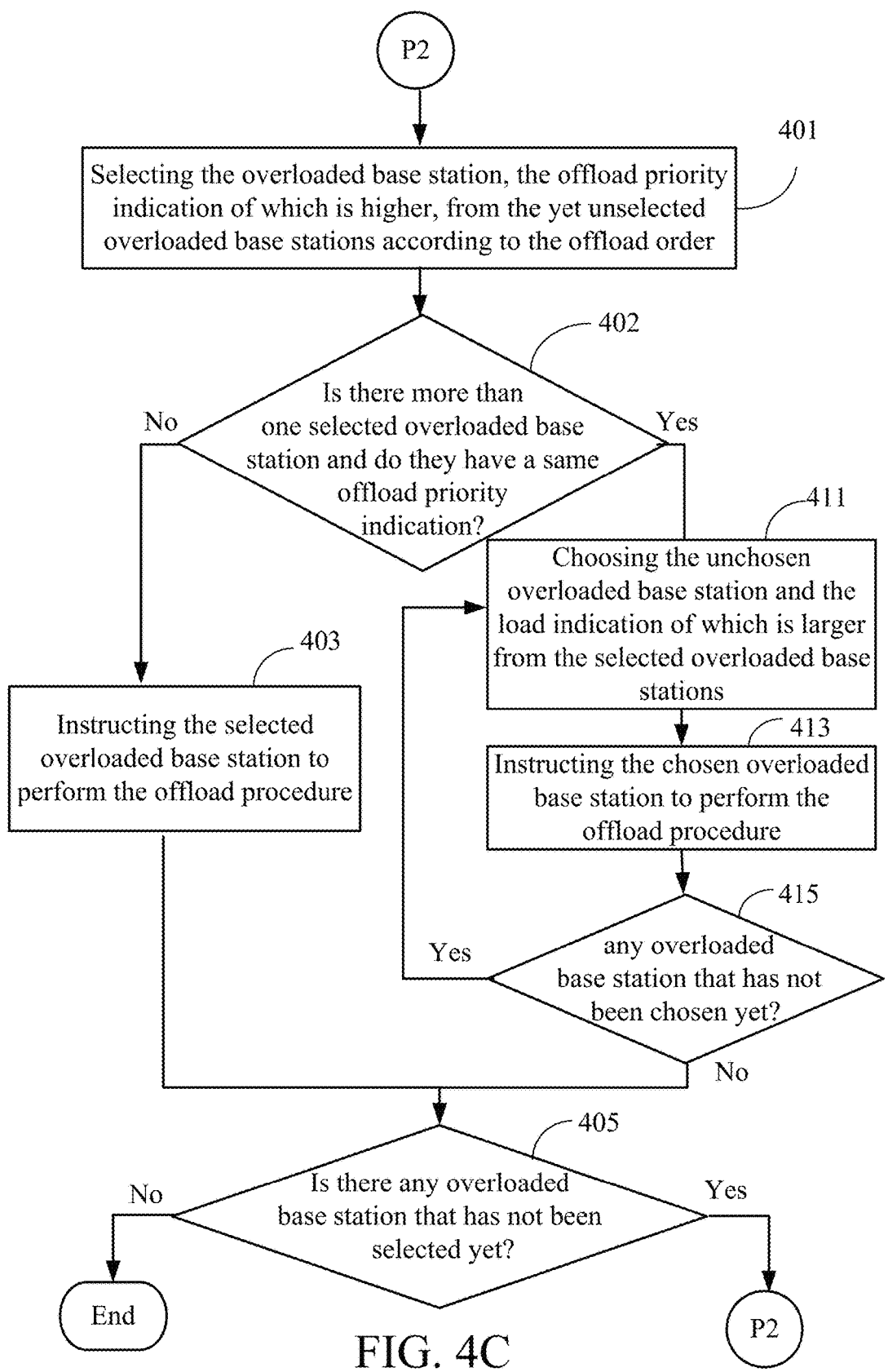
FIG. 4C is a flowchart diagram of a load balancing method according to the third embodiment of the present invention when combined with the flowchart diagram of FIG. 4A.

As shown in FIG. 4A and FIG. 4C, the third embodiment of the present invention is an extension of the second embodiment. This embodiment further considers a case where the overloaded base stations may have the same offload priority indication. Specifically, after step 401, step 402 is executed by the processor 15 to determine whether there is more than one overloaded base station to be selected and all of the selected overloaded base stations have a same offload priority indication. If more than one overloaded base station is selected and all of the selected overloaded base stations have the same offload priority indication, the processor 15 executes step 411 to choose the overloaded base station that has the higher load indication from the selected overloaded base stations (that have the same offload priority indication).

It shall be appreciated that in other embodiments, for those overloaded base stations that have the same offload priority indication, the processor 15 may first choose the overloaded base station, the neighboring base stations of which have more off-loadable resources, according to the off-loadable resources of respective neighboring base stations based on experiences in deploying the practical network and base stations. Accordingly, step 411 may instead, choose the overloaded base station, the neighboring base stations of which have more off-loadable resource from the selected overloaded base stations.

Next, the processor 15 executes step 413 to instruct the chosen overloaded base station to perform the offload procedure. Thereafter, the processor 15 executes step 415 to determine whether any of the overloaded base stations that have the same offload priority indication has not been chosen to perform the offload procedure yet. If the determination result is "yes", the processor 15 returns to step 411 to choose the overloaded base station that has the larger load indication or whose at least one neighboring base station has more off-loadable resources to perform the offload procedure from the overloaded base stations that have the same offload priority indication but have not yet been chosen to perform the offload procedure until all of the overloaded base stations that have the same offload priority indication have performed the offload procedure. In step 415, if the determination result is "no", the processor 15 executes step 405 to determine whether there are any overloaded base stations that has not been selected to perform the offload procedure yet.

On the other hand, in step 402, if there is only a single overloaded base station being selected (i.e., none of the other overloaded base stations have the same offload priority indication), the processor 15 executes step 403 to instruct the selected overloaded base station to perform the offload procedure. Then, the processor 15 also executes step 405 to determine whether any overloaded base station has not been selected to perform the offload procedure yet. If there are overloaded base stations that have not been selected yet, the processor 15 returns to step 401. If all of the overloaded base stations have been selected to perform the offload procedure, the processor 15 ends the load balancing procedure. In other words, in this embodiment, the processor 15 determines the offload order of the overloaded base stations according to the offload priority indications and the load indications, wherein for those overloaded base stations that have the same offload priority indication, the overloaded base station which has the larger load indication performs the offload procedures first. For example, when the offload priority indication of the overloaded base station B1 is the same as the offload priority indication of the overloaded base station B3, but the load indication of the overloaded base station B1 is larger than the load indication of the overloaded base station B3, the processor 15 first instructs the overloaded base station B1 to perform the offload procedure, and then instructs the overloaded base station B3 to perform the offload procedure.

As described above, in other embodiments, for those overloaded base stations that have the same offload priority indication, the overloaded base station whose at least one neighboring base station has more off-loadable resources may also be determined to perform the offload procedure first. For example, when the offload priority indication of the overloaded base station B1 is the same as the offload priority indication of the overloaded base station B3, but the neighboring base stations of the overloaded base station B1 have more off-loadable resources than the neighboring base stations of the overloaded base station B3, the processor 15 first instructs the overloaded base station B1 to perform the offload procedure, and then, instructs the overloaded base station B3 to perform the offload procedure.

It shall be appreciated that the processor 15 performs the load balancing procedure periodically (e.g., every 5 min, 10 min or 30 min, etc.). By receiving the load parameters P1~P5 of the base stations B1~B5 periodically and performing the load balancing procedure periodically, the central control device 1 can monitor the load of each of the base stations continuously.

Figure 5A:
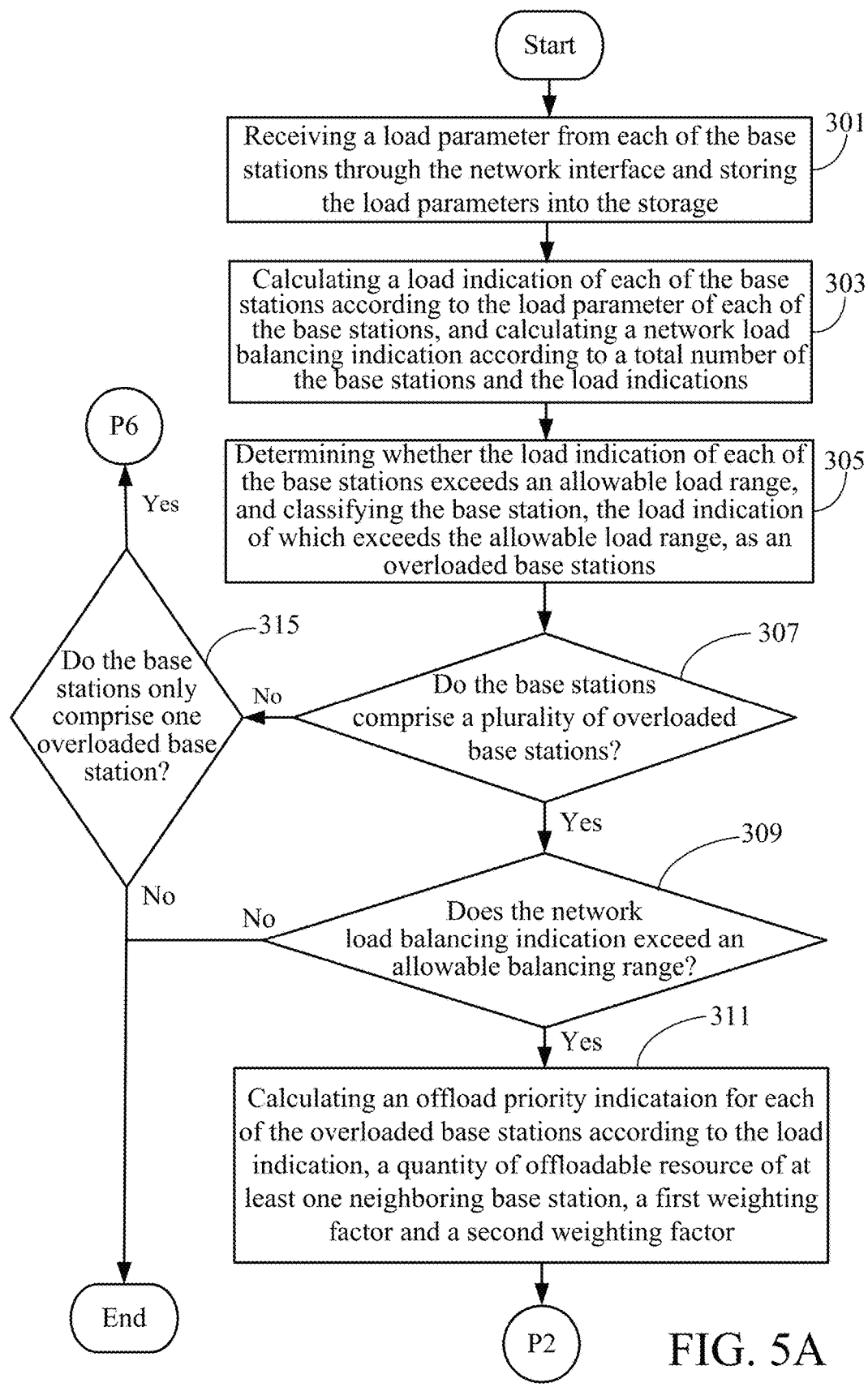
FIG. 5A to FIG. 5E are flowchart diagrams of a load balancing method according to the fourth embodiment of the present invention.
Figure 5B:
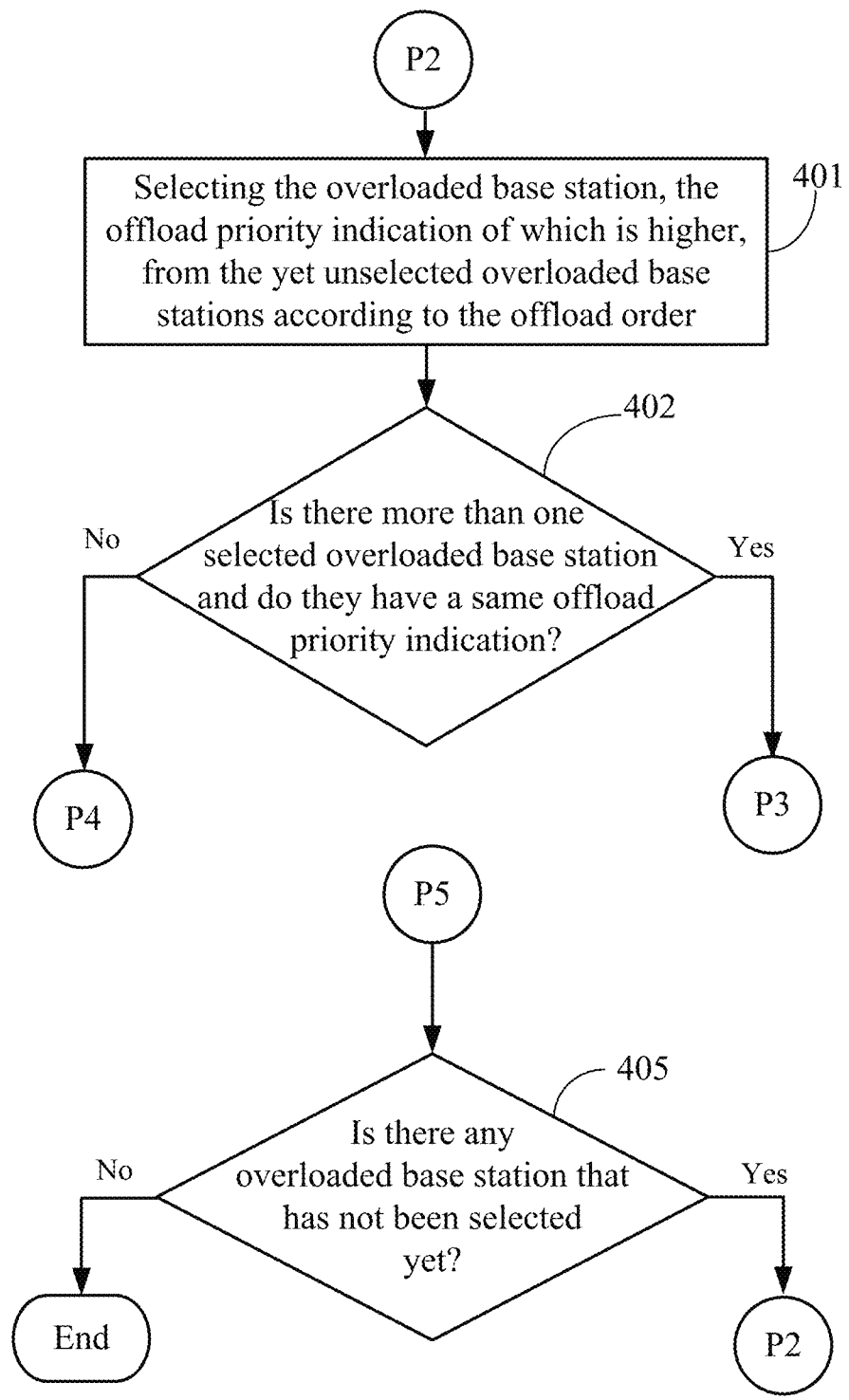
Figure 5C:
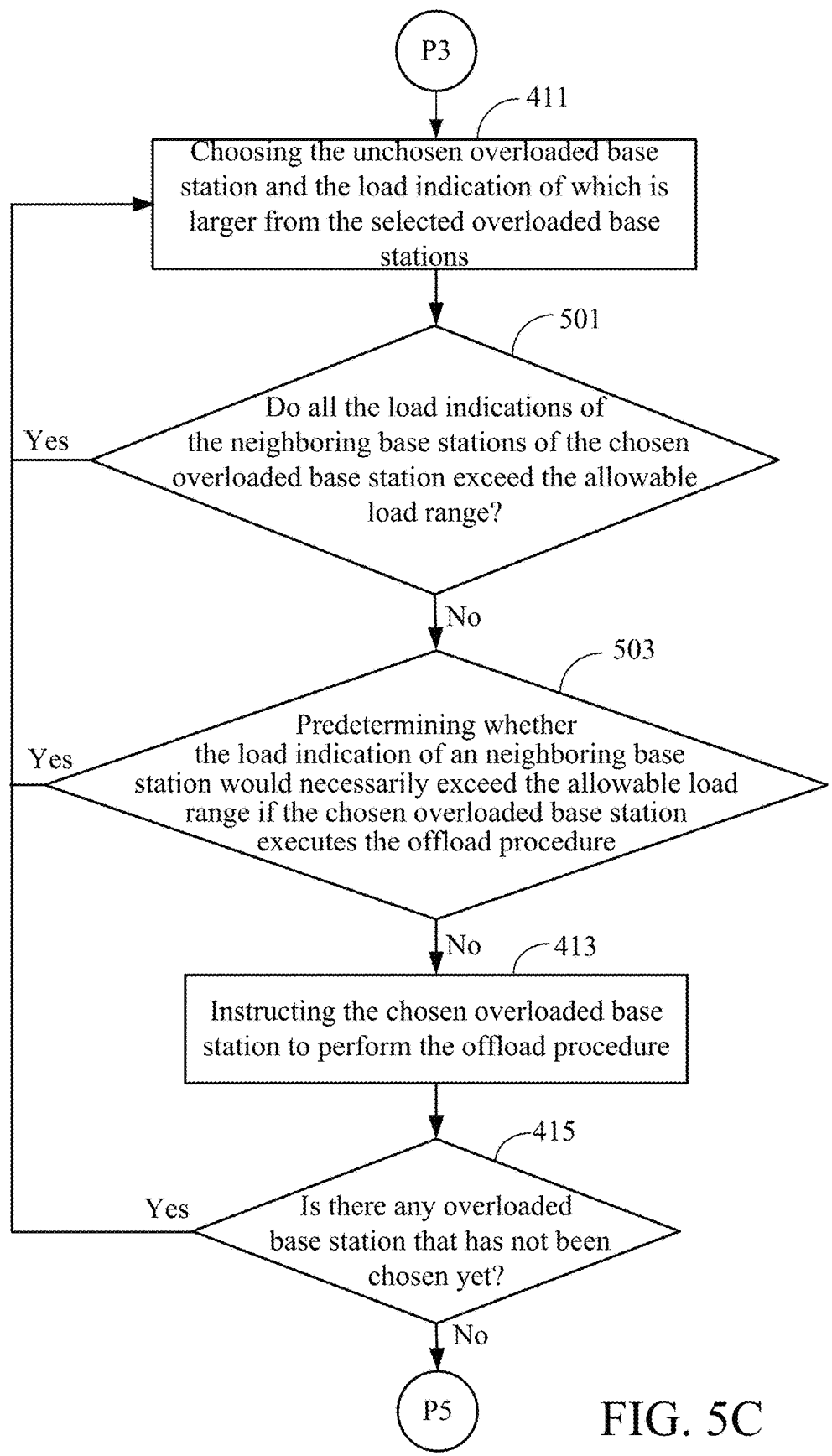
Figure 5D:
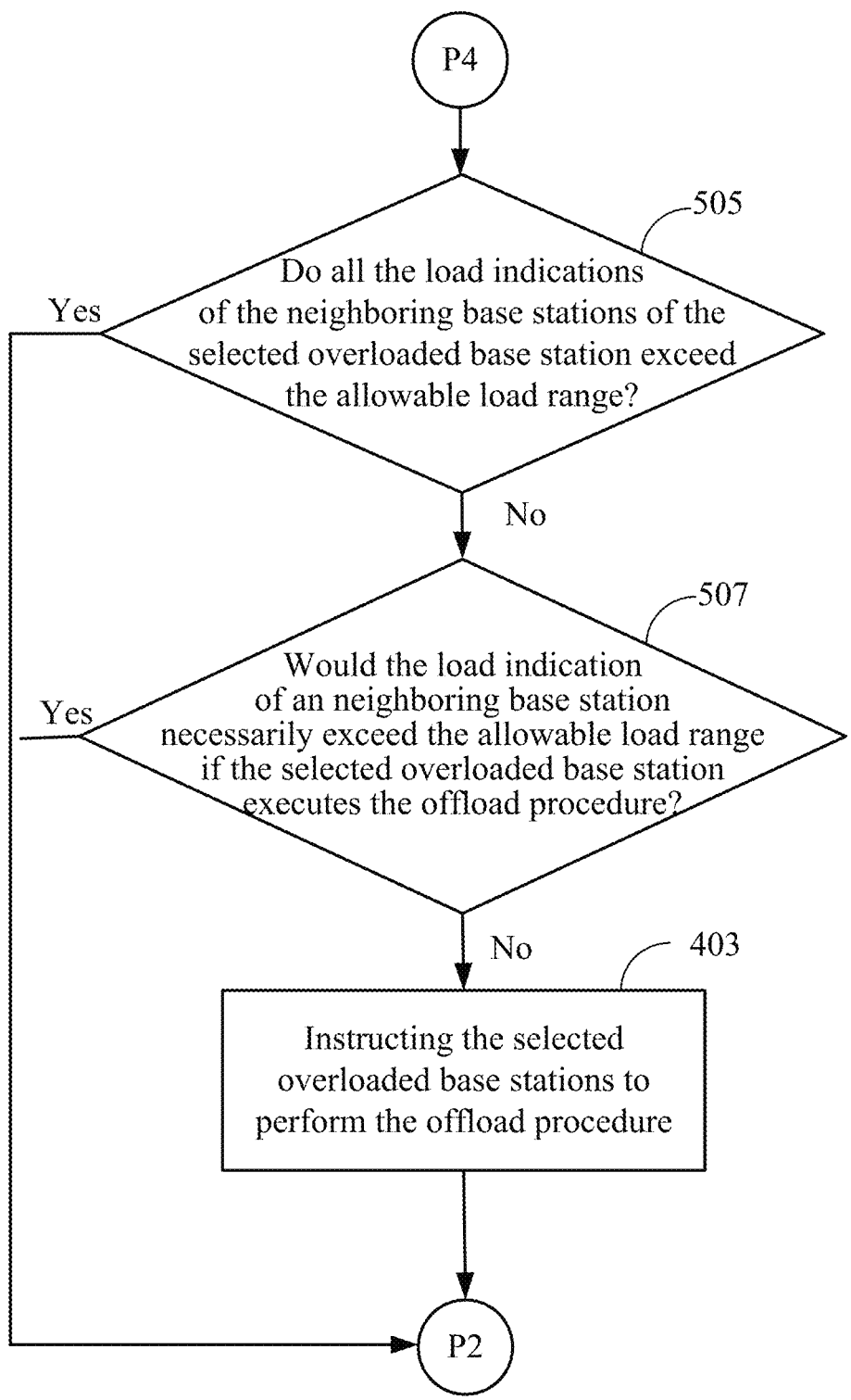
Figure 5E:
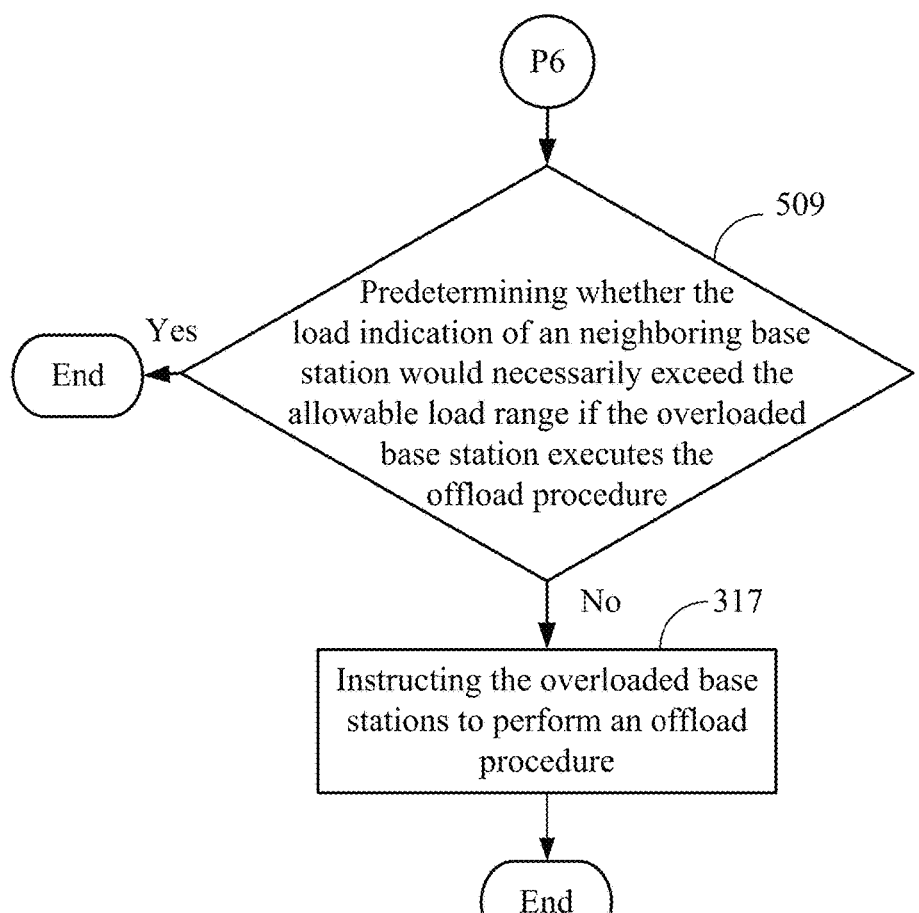

FIG. 5A to FIG. 5E are flowchart diagrams of a load balancing method according to the fourth embodiment of the present invention, which is an extension of the third embodiment. This embodiment further considers whether the overloaded base stations are suited to perform the offload procedure. As shown in FIG. 5B, if there is more than one overloaded base station selected and all of the selected overloaded base stations have the same offload priority indication, the processor 15 executes step 411 to choose the overloaded base station that has the larger load indication from the selected overloaded base stations. It shall be appreciated that in other embodiments, in step 411, the processor 15 may choose the overloaded base station, the off-loadable resources of the neighboring base station of which is larger, from the selected overloaded base stations.

Then, in step 501, the processor 15 further determines whether all the load indications of the neighboring base stations of the selected overloaded base station exceed the allowable load range. If all the load indications of the neighboring base stations exceed the allowable load range, the processor 15 skips the step of instructing the chosen overloaded base station to perform the offload procedure. In other words, if all the load indications of the neighboring base stations exceed the allowable load range, this means that all of the neighboring base stations are overloaded base stations and can not provide additional resource to other terminals. In this case, the chosen overloaded base station will not perform the offload procedure and the processor 15 returns to step 411 to choose the overloaded base station whose load indication is larger from the remaining overloaded base stations and further determines whether the overloaded base station can perform the offload procedure.

On the contrary, if the load indication of at least one neighboring base station falls within the allowable load range, this means that some of the neighboring base stations of the chosen overloaded base station are not overloaded. In this case, the processor 15 executes step 503. In step 503, the processor 15 predetermines whether the load indication of one of all the neighboring base stations would necessarily exceed the allowable load range if the chosen overloaded base station executes the offload procedure. If the determination result is "yes", the processor 15 will skip the step of instructing the overloaded base station to perform the offload procedure and return to step 411. In other words, if all the neighboring base stations are unsuited to provide additional resources for the overloaded base station to perform the offload procedure (i.e., if it is predicted that at least one of all the neighboring base stations will be turned into the overloaded base station because of the handover of terminals), the processor 15 will skip the step of instructing the overloaded base station to perform the offload procedure and return to step 411.

If the determination result is "no" in step 503, the processor 15 executes step 413 to instruct the chosen overloaded base station to perform the offload procedure to hand over some of terminals that occupy resources of the chosen overloaded base station to one or more target base stations, wherein each target base station is one of the neighboring base stations that is not overloaded and will not be turned into the overloaded base station after the handover process is finished.

On the other hand, if there is only one selected overloaded base station in step 402, the processor 15 further executes step 505 to determine whether all the load indications of the neighboring base stations of the selected overloaded base station exceed the allowable load range. If all the load indications of the neighboring base stations exceed the allowable load range, the processor 15 skips the step of instructing the selected overloaded base station to perform the offload procedure. In this case, the selected overloaded base station will not perform the offload procedure, and the processor 15 returns to step 401 to select the overloaded base station, the offload priority indication of which is larger, from the remaining overloaded base stations.

On the contrary, if the load indication of at least one neighboring base station falls within the allowable load range, this means that some of the neighboring base stations of the selected overloaded base station are not overloaded. In this case, the processor 15 executes step 507. In step 507, the processor 15 predetermines whether the load indication of one of all the neighboring base stations would necessarily exceed the allowable load range if the selected overloaded base station executes the offload procedure. In other words, the processor 15 will predict whether any of the neighboring base stations would be turned into the overloaded base station because of the handover. If the determination result is "yes", the processor 15 will skip the step of instructing the selected overloaded base station to perform the offload procedure and return to step 401. If the determination result is "no", the processor 15 executes step 403 to instruct the selected overloaded base station to perform the offload procedure to hand over some of terminals that occupy the resource of the selected overloaded base station to one or more target base stations, wherein each target base station is one of the neighboring base stations that is not overloaded and will not be turned into the overloaded base station after the handover process.

Figure 6:
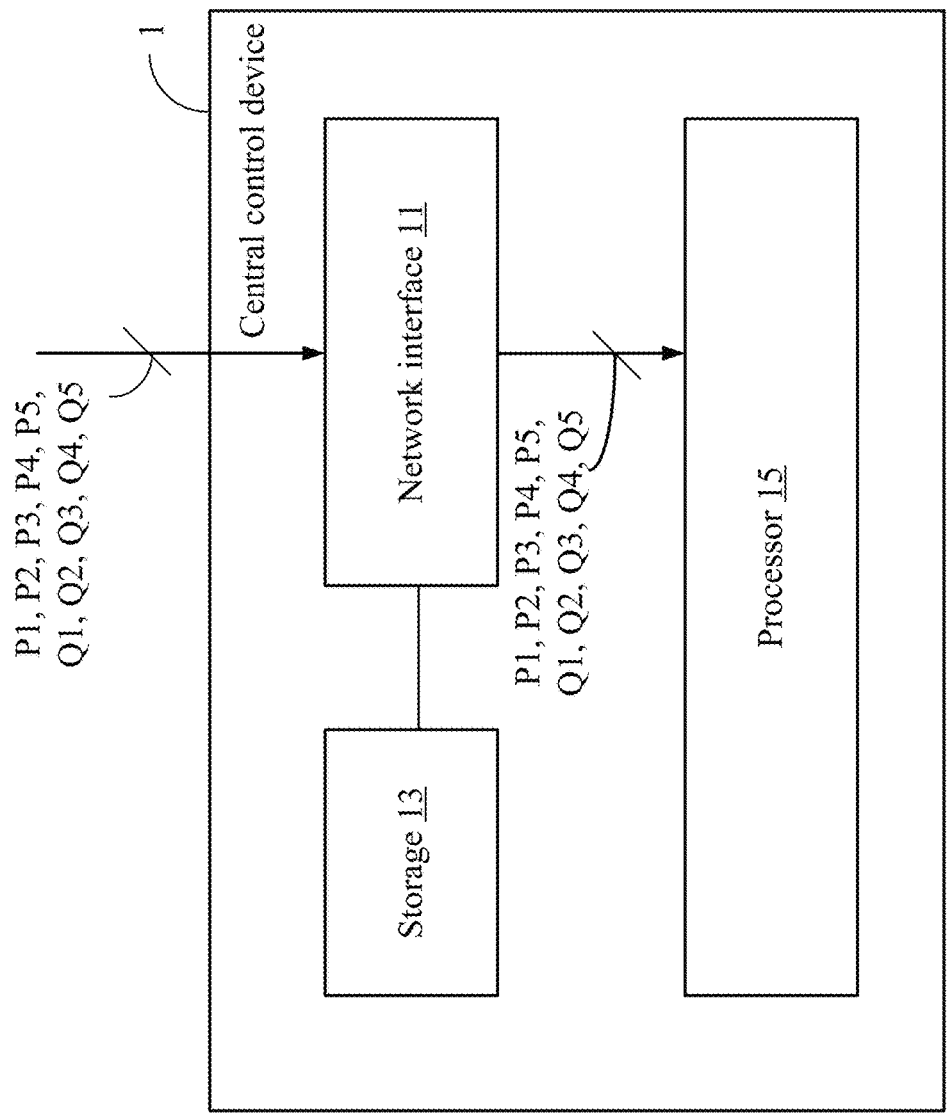
FIG. 6 is a schematic view of a central control device 1 according to the fourth embodiment of the present invention.

In detail, with reference to FIG. 6, the network interface 11 of the central control device 1 further receives signal quality parameters Q1~Q5 of the base stations B1~B5. The signal quality parameters Q1~Q5 represent the signal quality between the users and the base stations B1~B5. For example, the signal quality parameters may at least comprise reference signal received power (RSRP), signal-to-interference-plus-noise ratio (SINR), channel quality indication (CQI), etc. The processor 15 further stores the signal quality parameters Q1~Q5 to the storage 13.

In steps 403 and 413, the processor 15 further executes the following steps for each of the overloaded base stations: selecting from the neighboring base stations a base station, which is not overloaded and will not be turned into the overloaded base station after the handover process, as the target base station for performing the handover of the terminals and offloading.

For example, the processor 15 may further select the target base station for the handover according to the signal quality parameters between the terminal T11 and the neighboring base stations B2 and B4. In this case, the processor 15 may determine that the base station B2 will not be turned into the overloaded base station after the terminal T11 is handed over to the base station B2, and the signal quality between the terminal T11 and the base station B2 is superior to the signal quality between the terminal T11 and the base station B4. Accordingly, the processor 15 instructs the overloaded base station B1 to perform the offload procedure to hand over the terminal T11 to the base station B2.

It shall be appreciated that the central control device 1 of the present invention receives the load parameters and the signal quality parameters Q1~Q5 of the base stations B1-B5 continuously via the network interface 11, and monitors the load of the whole local area network continuously. If the central control device 1 determines that there is a plurality of overloaded base stations in the local area network and the network load balancing indication exceeds the allowable balancing range, the overloaded base stations perform the offload procedure sequentially according to the offload priority indication of each of the overloaded base stations as described in the aforesaid steps.

Similarly, in step 311, if it is determined that the network only comprises one overloaded base station, the processor 15 further executes step 509. In step 509, the processor 15 predetermines whether the load indication of one of all the neighboring base stations would necessarily exceed the allowable load range if the overloaded base station executes the offload procedure. If the determination result is "yes", the processor 15 will skip the step of instructing the overloaded base station to perform the offload procedure and end the load balancing procedure. If the determination result is "no", the processor 15 executes step 317 to instruct the overloaded base station to perform the offload procedure to hand over some of terminals that occupy resources of the overloaded base station to one or more target base stations, wherein each target base station is not overloaded and will not be turned into the overloaded base station after the handover process.

FIGS. 1 to 6 illustrate the fifth embodiment of the present invention, which is an extension of the first embodiment to the fourth embodiment. First, in step 301, the processor 15 calculates the load indication of each of the base stations according to Equation 1:

$$l(i) = \frac{u^{GBR}(i) + u^{non\text{-}GBR}(i)}{v^{total}(i)} \quad \text{(Equation 1)}$$

where, i represents the $i^{th}$ base station in the network, l(i) represents the load indication of the $i^{th}$ base station, $u^{GBR}(i)$ represents the used resources of guaranteed bit rate (GBR) in the $i^{th}$ base station, $u^{non\text{-}GBR}(i)$ represents the used resource of unguaranteed bit rate in the $i^{th}$ base station, and $v^{total}(i)$ represents the total resources of the $i^{th}$ base station. Therefore, in this embodiment, the load parameter of the $i^{th}$ base station comprises $u^{GBR}(i)$, $u^{non\text{-}GBR}(i)$ and $v^{total}(i)$.

In some wireless network systems, $u^{GBR}(i)$ and $u^{non\text{-}GBR}(i)$ t) are distinguished from each other according to the different service qualities that are provided to the terminals. A sum of them represents the used resource of the $i^{th}$ base station. As described above, the load indication represents the resource utilization ratio of the base station. Thus, for wireless network systems that do not distinguish between service qualities, the numerator of Equation 1 is replaced by the overall used resource. In other words, this embodiment only illustrates that the load indication can be represented by Equation 1 and is not intended to limit the calculation manner of the load indication.

Moreover, in step 301, the processor 15 calculates the network load balancing indication of the base stations in the network according to Equation 2:

$$\varphi = \frac{\left(\sum_{i \in N} l(i)\right)^2}{|N| \left(\sum_{i \in N} l(i)^2\right)} \quad \text{(Equation 2)}$$

where, φ is the network load balancing indication, N is the total number of the base stations in the network. This embodiment only illustrates that the network load balancing indication can be represented by Equation 2 and is not intended to limit the calculation mode of the network load balancing indication.

Furthermore, in step 307, the processor 15 calculates the offload priority indication of each of the overloaded base stations according to Equation 3:

$$\omega(i) = \alpha \cdot l(i) + \beta \cdot \mu(i) \quad \text{(Equation 3)}$$

where, ω(i) is the offload priority indication of the $i^{th}$ overloaded base station, l(i) is the load indication of the $i^{th}$ overloaded base station, µ(i) is the off-loadable resources of the neighboring base stations corresponding to the $i^{th}$ overloaded base station, α is the first weighting factor, β is the second weighting factor, and α+β=1, but α and β can be adjusted flexibly by telecommunication operators and network service suppliers according to experiences and practical operations of the network and the base stations.

According to the above descriptions, the central control device and the load balancing method of the present invention consider the overall load of the base stations in the network to optimize the load distribution of the base stations in the network; and meanwhile, the central control device and the load balancing method of the present invention consider both the load of the overloaded base station and offload amounts that the neighboring base stations of the overloaded base station can undertake to determine an offload order of the overloaded base stations. Moreover, the load balancing mechanism of the present invention sets a convergence condition so that the neighboring base stations that are not overloaded originally will not be turned into the overloaded base stations after the overloaded base station executes the offload procedure. Accordingly, the present invention can improve the wireless resource spectrum efficiency and the transmission network throughput effectively.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A central control device, comprising:
   a network interface connected to a plurality of base stations;
   a storage; and
   a processor electrically connected to the storage and the network interface, being configured to execute the following operations:
   (a) receiving a load parameter from each of the base stations via the network interface and storing the load parameters into the storage;
   (b) calculating a load indication of each of the base stations according to the load parameter of each of the base stations, and calculating a network load balancing indication according to a total number of the base stations and the load indications;
   (c) determining that the base station, the load indication of which exceeds an allowable load range, is an overloaded base station;
   (d) determining whether the network load balancing indication exceeds an allowable balancing range when the base stations comprise a plurality of overloaded base stations;
   (e) calculating an offload priority indication for each of the overloaded base stations according to the load indication, a quantity of offloadable resource of at least one neighboring base station, a first weighting factor and a second weighting factor when the network load balancing indication exceeds the allowable balancing range; and
   (f) determining an offload order of the overloaded base stations according to the offload priority indications.

2. The central control device as claimed in claim 1, wherein the processor further executes the following operation:
   instructing the overloaded base stations to perform an offload procedure sequentially according to the offload order, wherein the overloaded base station, the offload priority indication of which is larger, performs the offload procedure first.

3. The central control device as claimed in claim 2, wherein the processor further executes the following operation:
   determining the offload order of the overloaded base stations according to the offload priority indications and the load indications, wherein the overloaded base stations that have a same offload priority indication, the overloaded base station, the load indication of which is larger, performs the offload procedure first.

4. The central control device as claimed in claim 2, wherein the processor further executes the following operation:
   determining the offload order of the overloaded base stations according to the offload priority indications and the offloadable resource of the at least one neighboring base station of each of the overloaded base stations, wherein for the overloaded base stations having a same offload priority indication, the overloaded base station, the offloadable resource of the at least one neighboring base station of which is larger, performs the offload procedure first.

5. The central control device as claimed in claim 2, wherein the processor further executes the following operation:
   for each of the overloaded base stations, skipping the operation of instructing the overloaded base station to perform the offload procedure when the load indication of each of the at least one neighboring base station exceeds the allowable load range.

6. The central control device as claimed in claim 2, wherein the processor further executes the following operations:
   for each of the overloaded base stations, when the load indication of one of the at least one neighboring base station falls within the allowable load range, predetermining whether the offload procedure executed by the overloaded base station definitely makes the load indication of one of the at least one neighboring base station exceed the allowable load range;
   when the determination result is "yes", skipping the operation of instructing the overloaded base station to perform the offload procedure; and
   when the determination result is "no", instructing the overloaded base station to perform the offload procedure so as to hand over at least one terminal to at least one target base station selected from the at least one neighboring base station, wherein the at least one target base station will be not turned into the overloaded base station when the at least one terminal is handed over to the at least one target base station.

7. The central control device as claimed in claim 1, wherein the processor calculates the offload priority indication according to the following equation:

$$\omega(i) = \alpha \cdot l(i) + \beta \cdot \mu(i),$$

where, $\omega(i)$ is the offload priority indication of the $i^{th}$ overloaded base station, $l(i)$ is the load indication of the $i^{th}$ overloaded base station, $\mu(i)$ is the offloadable resource of the neighboring base stations corresponding to the $i^{th}$ overloaded base station, $\alpha$ is the first weighting factor, $\beta$ is the second weighting factor, and $\alpha + \beta = 1$.

8. The central control device as claimed in claim 1, wherein the processor returns to the operation (a) when all the load indications of the base stations fall within the allowable load range or when the network load balancing indication falls within the allowable balancing range.

9. The central control device as claimed in claim 1, wherein the processor further executes the following operations of:
   when the base stations only comprise one overloaded base station, the processor executes the following operations for the overloaded base station:
      predetermining whether the offload procedure executed by the overloaded base station definitely makes the load indication of one of the at least one neighboring base station exceed the allowable load range;
when the determination result is "yes", skipping the operation of instructing the overloaded base station to perform the offload procedure; and
when the determination result is "no", instructing the overloaded base station to perform the offload procedure so as to hand over at least one terminal to at least one target base station selected from the at least one neighboring base station, wherein the at least one target base station will be not turned into the overloaded base station when the at least one terminal is handed over to the at least one target base station.

10. A load balancing method for use in a central control device, the central control device comprising a network interface, a storage and a processor, the network interface being connected to a plurality of base stations, the processor being electrically connected to the storage and the network interface, and the load balancing method being executed by the processor, the method comprising:
(a) receiving a load parameter from each of the base stations via the network interface and storing the load parameters into the storage;
(b) calculating a load indication of each of the base stations according to the load parameter of each of the base stations, and calculating a network load balancing indication according to a total number of the base stations and the load indications;
(c) determining that the base station, the load indication of which exceeds an allowable load range, is an overloaded base station;
(d) determining whether the network load balancing indication exceeds an allowable balancing range when the base stations comprise a plurality of overloaded base stations;
(e) calculating an offload priority indication for each of the overloaded base stations according to the load indication, a quantity of offloadable resource of at least one neighboring base station, a first weighting factor and a second weighting factor when the network load balancing indication exceeds the allowable balancing range; and
(f) determining an offload order of the overloaded base stations according to the offload priority indications.

11. The load balancing method as claimed in claim 10, further comprising:
instructing the overloaded base stations to perform an offload procedure sequentially according to the offload order, wherein the overloaded base station, the offload priority indication of which is larger, performs the offload procedure first.

12. The load balancing method as claimed in claim 11, further comprising:
determining the offload order of the overloaded base stations according to the offload priority indications and the load indications, wherein for the overloaded base stations that have a same offload priority indication, the overloaded base station, the load indication of which is larger, performs the offload procedure first.

13. The load balancing method as claimed in claim 11, further comprising:
determining the offload order of the overloaded base stations according to the offload priority indications and the offloadable resource of the at least one neighboring base station of each of the overloaded base stations, wherein for the overloaded base stations having a same offload priority indication, the overloaded base station, the offloadable resource of the at least one neighboring base station of which is larger, performs the offload procedure first.

14. The load balancing method as claimed in claim 11, further comprising:
for each of the overloaded base stations, skipping the step of instructing the overloaded base station to perform the offload procedure when the load indication of each of the at least one neighboring base station exceeds the allowable load range.

15. The load balancing method as claimed in claim 11, wherein the load balancing method further comprises:
for each of the overloaded base stations, the following steps are executed:
when the load indication of one of the at least one neighboring base station falls within the allowable load range, predetermining whether the offload procedure executed by the overloaded base station definitely makes the load indication of one of the at least one neighboring base station exceed the allowable load range;
when the determination result is "yes", skipping the step of instructing the overloaded base station to perform the offload procedure; and
when the determination result is "no", instructing the overloaded base station to perform the offload procedure so as to hand over at least one terminal to at least one target base station selected from the at least one neighboring base station, wherein the at least one target base station will be not turned into the overloaded base station when the at least one terminal is handed over to the at least one target base station.

16. The load balancing method as claimed in claim 10, wherein the step (e) calculates the offload priority indication according to the following equation:

$$\omega(i)=\alpha \cdot l(i)+\beta \cdot \mu(i),$$

Where, $\omega(i)$ is the offload priority indication of $i^{th}$ overloaded base station, $l(i)$ is the load indication of the $i^{th}$ overloaded base station, $\mu(i)$ is the offloadable resource of the neighboring base stations corresponding to the $i^{th}$ overloaded base station, $\alpha$ is the first weighting factor, $\beta$ is the second weighting factor, and $\alpha+\beta=1$.

17. The load balancing method as claimed in claim 10, wherein the processor returns to the step (a) when all the load indications of the base stations fall within the allowable load range or when the network load balancing indication falls within the allowable balancing range.

18. The load balancing method as claimed in claim 10, further comprising:
when the base stations only comprises one overloaded base station, the following steps are executed for the overloaded base station:
predetermining whether the offload procedure executed by the overloaded base station definitely makes the load indication of one of the at least one neighboring base station exceed the allowable load range;
when the determination result is "yes", skipping the step of instructing the overloaded base station to perform the offload procedure; and
when the determination result is "no", instructing the overloaded base station to perform the offload procedure so as to hand over at least one terminal to at least one target base station selected from the at least one neighboring base station, wherein the at least one target base station will be not turned into the overloaded base station when the at least one terminal is handed over to the at least one target base station.

* * * * *